July 18, 1961 W. A. EDSON 2,993,139

MICROWAVE MODULATOR DEVICE

Filed Oct. 1, 1957 2 Sheets-Sheet 1

WILLIAM A. EDSON
INVENTOR.

BY Urban H. Faubion
ATTORNEY

July 18, 1961 W. A. EDSON 2,993,139
MICROWAVE MODULATOR DEVICE
Filed Oct. 1, 1957 2 Sheets-Sheet 2

WILLIAM A. EDSON
INVENTOR.
BY Urban H. Faubion
ATTORNEY 2,993,139
Patented July 18, 1961

2,993,139

MICROWAVE MODULATOR DEVICE

William A. Edson, Los Altos Hills, Calif., assignor to General Electric Company, a corporation of New York Filed Oct. 1, 1957, Ser. No. 687,497
10 Claims. (Cl. 315—3.5)

This invention relates to a modulator which may be used at microwave frequencies. More particularly, the invention relates to such a device which utilizes a single non-linear electron stream in a high frequency energy interchange device wherein an interchange of energy takes place between the electron stream and a radio frequency field to provide modulation.

Generally speaking, modulation is obtained whenever the amplitude of a component of an output wave from a circuit is made proportional to the product of the amplitudes of two input waves and the circuit which provides such action is termed a modulator. In order to accomplish these results the two voltage waves (or input signals) must be applied to a non-linear element. As described in many elementary texts, when the product of two applied voltages is obtained by applying them to a non-linear element, two new frequencies equal to the sum and difference of the applied frequencies are always obtained and, in the case of conventional unbalanced modulators, many other frequencies are obtained including the frequencies of each of the voltage waves. For example, see "Communication Engineering" by Everett, Chapter 13, pages 376 through 412 inclusive, second edition, McGraw-Hill Book Company, 1937.

Modulators are useful in communication systems to prepare messages for transmission through the medium to be used, to prepare received signals for their end use, and for many other applications. One of the most typical examples is in the case of transmission of ordinary speech, or audio signals. For such transmission it is necessary to translate the frequency of the signals to a higher region since it is generally considered to be impractical to design antennas which will efficiently radiate the band of frequencies in the audio range.

Another field of usefulness for modulators is in the art of frequency synthesis or composition; that is, where it is desirable to produce a given frequency not directly but indirectly by use of multiplication or division together with modulation for addition and subtraction of frequencies.

In practical applications, it is usually preferred to eliminate a large number of the frequencies present in the output of the conventional unbalanced modulator. As a consequence a modulator frequently referred to as a balanced modulator has been derived. Ordinarily, two similar non-linear elements are necessary in a balanced modulator. Each of the non-linear elements is used in a conventional unbalanced type of modulator and the outputs of these unbalanced modulators are so interconnected that the modulated waves are reversed. By this arrangement, the difference between the two modulated waves is obtained. Therefore, the output of the balanced modulator (the difference wave) contains frequency components which include only one of the two applied frequencies together with both the sum and difference of these two frequencies.

The balanced modulator finds particular application in frequency synthesis and also in connection with a type of communication referred to in the literature as synchronous communication or double side-band suppressed-carrier communication wherein the sum and difference of the two input frequencies (the two side bands) are used. For a discussion of synchronous communication, see the article entitled, "Synchronous Communications" by John P. Costas on page 1713 in the Proceedings of the IRE, volume 44, 1956.

Balanced modulators are available which are very satisfactory for use at low frequencies. The balanced modulator on page 392 in FIGURE 226 of the book by Everett supra is an example. However, high frequency modulators of any type are not too plentiful and particularly balanced modulators which will operate in the microwave region. Modulators which will operate in this region may be obtained by substituting appropriate circuit elements such as coaxial or hollow waveguides and non-linear circuit elements which are appropriate for use at microwave frequencies for the equivalent elements of the circuit illustrated in the text. However, such modulators suffer the disadvantage that they produce a considerable insertion loss, are subject to burnout at rather low power levels, and are restricted in band width by the inherent residual inductances and capacitances in the circuit elements.

Accordingly, it is an object of this invention to produce a modulator for operation in the microwave region.

A further object of this invention is to provide a balanced modulator which utilizes only one non-linear element.

It is a still further object of this invention to provide a balanced modulator for operation in the microwave frequency range which has the previously unattained characteristic of providing conversion gain, substantial power output and may be operated over a broad frequency band.

In attaining the foregoing objects, the modulation is carried out utilizing the non-linearity of a saturated electron stream in which the electrons are bunched at one of the frequencies to be multiplied and modulating the electron stream with a second frequency thereby producing in the electron stream all of the frequency components which are normally produced by any conventional modulator. Directional coupling techniques are then used to obtain a voltage wave having the desired frequency components from the electron stream.

In the embodiment of the invention illustrated, the broad band characteristics of a traveling wave tube are utilized to obtain the desired broad frequency band of operation desired and the non-linearity of the electron stream when it is in the saturation region is utilized to obtain modulation. Balanced modulator action is obtained by use of directional coupling techniques.

In a conventional traveling wave tube, an elongated section of transmission line is mounted within an evacuated envelope. An input radio frequency wave is coupled onto the transmission line and the transmission line is designed as a delay line along which electromagnetic waves are transmitted at some relatively small fraction of the velocity of light. In the most conventional form, the delay line is a conductive helix such as a helical metal coil. An electron stream is projected along the helix in such a manner that the electrons in the stream and the radio frequency field produced by the helix travel in close proximity. The beam velocity is made substantially equal to, or synchronous with, the axial component of the wave velocity along the helix. In operation, a wave traveling along the transmission line interacts with the electrons in the stream to cause a redistribution in the form of partial bunching along the stream. As the wave and beam travel synchronously along the helix, the inverse phenomenon occurs, and the bunched beam induces fields and currents upon the helix. The amplitude of the wave increases along the helix because the electron stream gives up more energy to the helix than it abstracts from it. Consequently, an amplification of the radio frequency wave on the helix takes place.

The axial velocity of a wave along a simple helical coil appropriately designed for very high frequencies is determined largely by the diameter and pitch of the helix and is substantially independent of the frequency of the wave transmitted. Therefore, traveling wave tubes which utilize a helical transmission line operate over an extremely broad band of frequencies e.g., from 7 to 12 kilomegacycles. Thus, the traveling wave tube is said to be broad band. The more complex transmission lines such as cross wound helices, multifiler helices, and periodically loaded wave guides which are used with traveling wave tubes having large power handling capabilities operate only over much narrower frequency ranges, which, however, are still of engineering interest for many uses.

Thus, in the embodiment illustrated, the modulation is achieved through the non-linearity of a saturated electron stream of a traveling wave tube which has been bunched at one frequency by coupling onto the tube transmission line a second wave having a different frequency. This second wave is propagated along the transmission line and interacts with the already modulated electron stream in such a manner as to produce on the main transmission line a wave which contains several frequency components including the frequency of the first wave coupled onto the transmission line as well as the sum and difference frequencies of the two waves coupled thereon. In order to provide balanced modulator action, the second frequency is coupled onto the main transmission line by means of an output transmission line in such a manner that substantially 100% of the wave on the output transmission line is transferred to the main tube transmission line. The output transmission line may also be used to couple the wave off of the main transmission line as described in more detail subsequently. Thus, the device provided acts as a balanced modulator.

The features which are characteristic of this invention and are believed to be novel are set forth with particularity in the appended claims. The invention itself however, both as to its organization and method of operation together with further objects and advantages thereof may best be understood by reference to the following description taken in connection with the accompanying drawing in which:

Figures 1, 2:
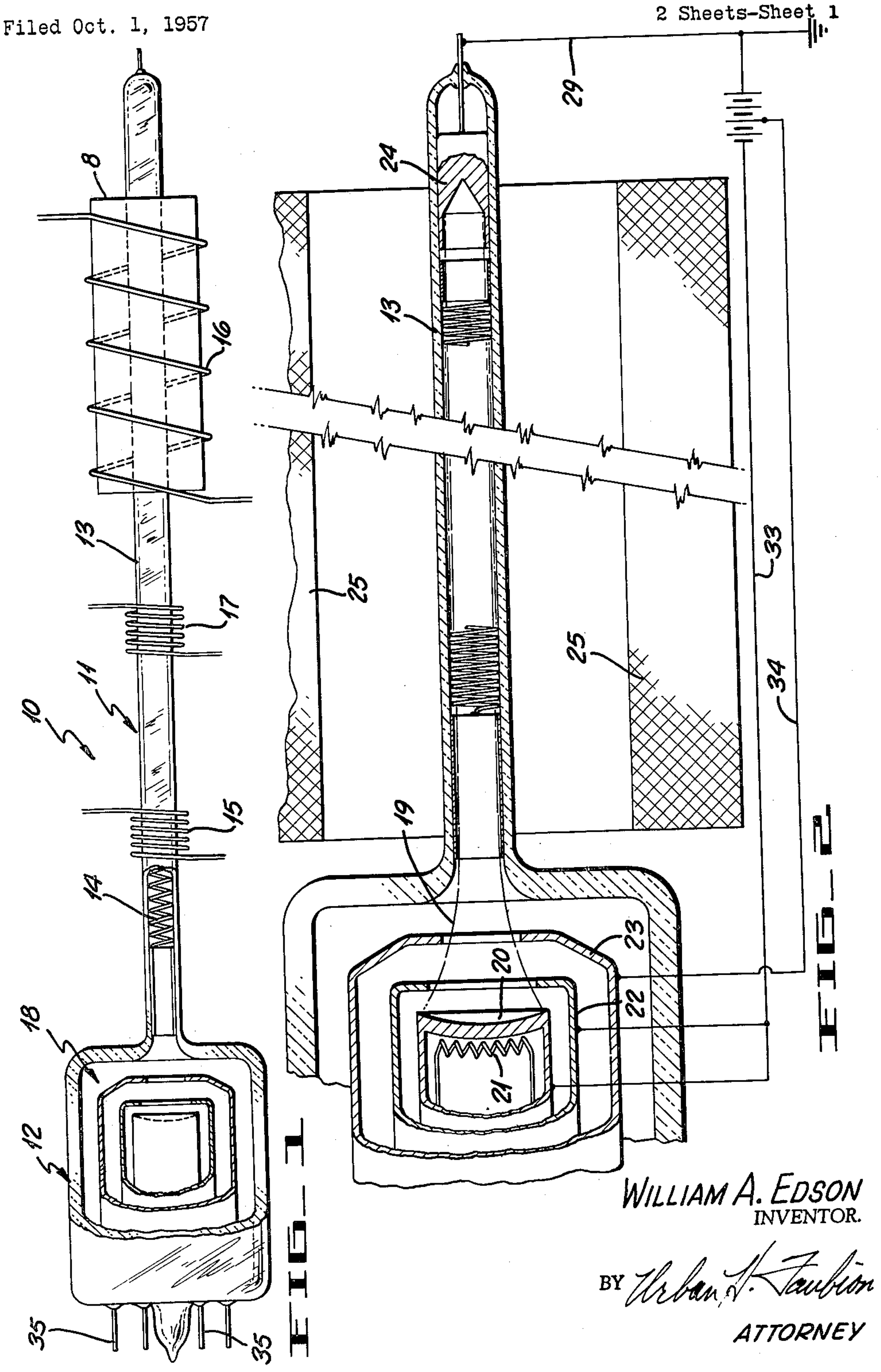
FIGURE 1 is a partially broken away and partial sectional view of a vacuum tube according to the invention showing one embodiment of such a tube and indicating the general arrangement of the main helical transmission line, the electron gun for projecting an electron stream through the coil, and the coupler transmission lines used to couple onto the main transmission line.
FIGURE 2 is a broken longitudinal sectional view of a traveling wave tube embodying one form of the invention and illustrating the general construction of the tube.

Referring specifically to FIGURE 1 of the drawings, it is seen that the traveling wave tube 10 is provided with an envelope 11, that is generally long and cylindrical with an enlarged cylindrical portion 12 at one end which houses an electron stream producing gun 18 and a small slender cylindrical portion 13 which houses the long helical main interaction transmission line 14 commonly referred to as the beam helix. The particular tube illustrated is quite long since a considerable length is required to provide the desired interaction with the electron stream and also to obtain the type of directional coupling between the external input and output transmission lines or coupler coils 15 and 16 respectively, and the main transmission line 14. The particular tube illustrated was designed to operate in the X-band region; that is, in the region of frequencies between 7000 and 12,000 megacycles.

The input coupler 15, is provided to couple an electromagnetic wave at one frequency $f_1$ onto the main transmission line 14 and consists of a coil of wire wound around the slender portion 13 of the envelope 11 which is nearest the enlarged portion 12 provided for the electron gun 18. The second or output coupler 16 also consists of a conductor wound around an annular non-magnetic spacer 8, at the opposite end of the envelope 11 which is provided to couple a second electromagnetic wave of frequency $f_2$ onto the beam helix or transmission line 14 of the traveling wave tube and simultaneously to couple an output wave off from the beam helix 14. The diameter of the output coupler 16 is made very large with respect to that of the beam helix 14 in order to provide a very loose coupling between the two transmission lines. The reason for this is explained more fully in connection with the detailed description of the operation of the modulator.

In order to attenuate completely any energy reflected from the output end of the tube and prevent external coupling between the input and output couplers 15 and 16, still a third coupler 17, called an attenuator, is wound around the envelope of the tube intermediate the input and output couplers 15 and 16. The attenuator 17 is preferably shorted on itself to form a closed loop and since attenuation is most effective if the attenuator 17 is lossy, it is preferably wound of a high resistance wire.

It is to be particularly understood that the invention is described in connection with the particular type of traveling wave tube illustrated only as a matter of convenience and that the transmission lines and couplers may take any form which will meet the boundary conditions set forth in the following description. For example, instead of using the helical slow-wave circuit 14 illustrated, a periodically loaded waveguide structure may be used and the couplers 15 and 16 could then be replaced by any known type of transmission line which may be coupled to the slow-wave circuit in the general manner described herein.

FIGURE 2 illustrates the traveling wave amplifier tube 10 of FIGURE 1 in greater detail. FIGURE 2 is drawn to a larger scale more clearly to show certain details of the construction. Since it has not been possible to show the full length of the tube 10 as illustrated in FIGURE 1 and keep within the limitations of the space available, the center portion of the tube is broken away. It is to be understood, however, that the tube length is not limited to that indicated and may be less or much greater within practical design limitations. The particular tube illustrated was in one instance approximately 12" long.

As previously indicated, the enlarged portion 12 at one end of the evacuated envelope encloses an electron gun 18 for producing a stream of electrons along the axis of the envelope 11 as depicted by the broken lines 19. The electrons which are formed into a stream are emitted from a cathode 20, in response to heat applied thereto by a heater 21. The heater 21 is illustrated as a high resistance coil member which must be connected to a source of voltage (not shown) in order to produce the necessary heat. The electron stream is formed and projected along the axis of the tube by a centrally apertured electron stream focusing electrode 22 and a centrally apertured electron stream accelerating anode 23. Since the elongated beam helix 14 is positioned inside the slender portion 13 of the envelope with its axis coincident with the tube axis, the electron stream 19 flows down the length of the tube in close proximity thereto, thus providing an interaction region along the tube axis. A collector anode 24 is positioned at the opposite or output end of the structure to dissipate residual energy in the stream.

In order to prevent the space charge of the electrons from spreading them to such an extent that they pass out of the interaction region, it is necessary to provide some focusing means. Focusing is provided by providing a magnetic field axially along the structure. This is typically done by providing a long annular solenoid 25 which surrounds the entire tube along its length. To simplify the present drawing and description, the magnetic field producing solenoid 25 is only partially and schematically illustrated and its source of energizing potential is not shown. Operating power for the tube is provided by a power source 26 (illustrated as a battery) which has a positive terminal connected to the collector anode 24 and to ground or reference potential by means of a conducting lead 29 brought out through the tube envelope 11 and a negative terminal connected to the focusing electrode 22 and cathode 20 by means of a conducting lead 33. The accelerating anode 23 is connected by the conductor 34 to receive a unidirectional potential from the battery 26 which is intermediate that supplied to the cathode 20 and collector anode 24. Electrical connections to the parts of the electron gun 18 are brought out on pins 35 (shown in FIGURE 1) but are shown schematically here to simplify the drawings. The relative potentials of the electrodes of the electron gun is determined by well known gun design considerations. (See J. R. Pierce Theory and Design of Electron Beams, second edition, 1954, Van Nostrand Co.)

Figure 3:
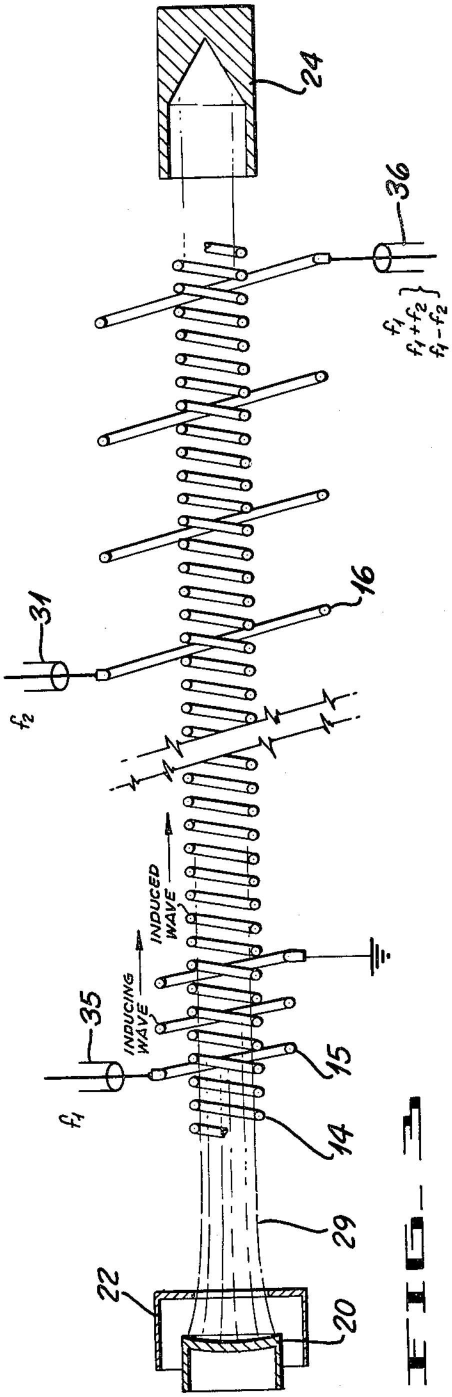
FIGURE 3 is a detailed view illustrating the arrangement of both the input and output coupling transmission lines with respect to the internal helical main transmission line.

A desired voltage wave is coupled or transferred onto the slow-wave transmission line or beam helix 14 in such a manner that the transferred wave is later propagated from the gun end of the tube toward the output end. As may best be seen in FIGURE 3, the input coupler or transmission line 15 is a helical coil wound externally of the tube and coaxially with the beam helix 14 and the input wave is introduced thereon by means of a coaxial transmission line 30. In order to provide the proper directional coupling between two coaxial helices, the input coupler 15 is wound in an opposite sense to the beam helix 14. As illustrated in the drawing, the beam helix 14 is a right hand wound helix and the input coupler 15 is a left hand wound helix. The input helical coupler 15 is essentially a type of directional coupler and may be described in terms of well known coupled transmission line theory as discussed in the article, "Directional Electromagnetic Couplers," by B. M. Oliver in the Proceedings of the I.R.E., volume 42, 1954, pages 1686–1692, and the article, "Helix Coupled Traveling-Wave Tubes," by Peter D. Lacy in the November 1954 issue of Electronics Magazine, pages 132–135. For example, it is well known that where two parallel transmission line systems have mutual coupling between them along their length, a wave on one system will excite a wave traveling in the opposite direction upon the other transmission line system. If these systems are formed into two parallel helices wound in opposite senses, the coupled or induced wave will travel in the same direction as the inducing wave even though the coupled wave is induced in the opposite direction. This relationship exists between input coupler helix 15 and the beam helix 14 since they are oppositely wound and coaxial. The direction of the inducing and induced waves are indicated by the arrows marked inducing wave and induced wave in FIGURE 3. In this figure, the inducing wave is introduced on the left hand wound input coupler helix 15 by means of a coaxial transmission line 35 and the induced wave is built up on the right hand wound beam helix 14 in such a manner that both waves proceed away from the electron gun 18 along the tube 10 toward the output end.

Figure 4:
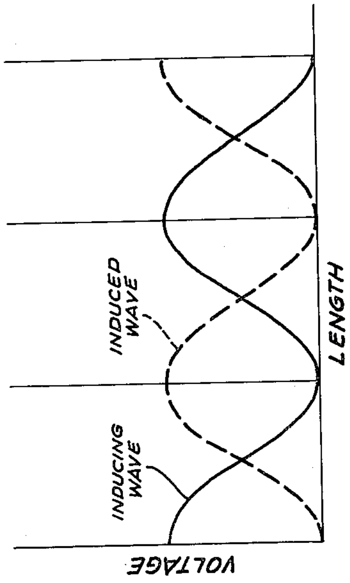
FIGURE 4 is a plot of voltages along the coupled transmission line of FIGURE 3 illustrating the transferral of energy between directional coupled transmission lines.

It is an additional property of two coupled systems having the same velocities of propagation that all of the power in a wave on one system (the primary system) is transferred to the other system (the secondary system) and if the systems are long enough, the power flow reverses and the power in the secondary system is transferred back to the primary system. This relationship is illustrated in connection with FIGURE 4 wherein the sinusoidal wave labeled "inducing wave" represents the wave as produced on the input helix or transmission line 16 (the primary system) and the broken line sinusoidal wave marked "induced wave" indicates the wave on the beam helix 14. An inspection of the system shows that initially all of the primary wave is on the input coupling helix 15. As the wave is propagated from left to right along the length of the two systems, the voltage from the inducing wave is transferred therefrom. In designing the input coupler 15, its length is selected so that all of the power in it is transferred to the beam helix 14. As described in the Lacy article supra, this power transfer from one helical transmission line to the other is maximum for a quarter space-beat-wavelength section (i.e., the space-beat-wavelength as distinguished from the actual or guide wavelength). The beat wavelength depends upon factors such as degree of coupling etc. and may be very long, many times the actual wavelength, if the coupling is low. In practice the coupling between the input coupler 15 and the beam helix 14 is made fairly tight so that all of the primary power may be transferred to the beam helix by a relatively short helix (of the order of an actual wave length). Thus, electromagnetic fields are generated inside the beam helix 14 (in the interaction region) throughout its length.

The portion of the modulator thus far described, then, acts as a conventional traveling wave amplifier. That is to say, the electromagnetic waves in the beam helix 14 interact with the electrons in the stream to produce electron velocity modulation and consequently electron bunching. As the wave and beam travel along the helix, the phenomenon reverses and the bunched beam induces fields and currents along the helix and the amplitude of the wave on the helix grows exponentially until the stream becomes saturated because the stream gives up more energy to the beam helix 14 than it abstracts from it.

It should be noted here that the presence of an electron stream within the coaxial transmission line affects the coupling between the two helices in that it has an effect upon the length of transmission line required to transfer 100% of the power from one line to the other. It does not, however, alter the basic coupling principle in any way. It may also be worthwhile to note that an electron stream passing through two helical transmission lines which are coaxial does not interact in any appreciable amount with electric and magnetic fields produced by the outer transmission line. Thus, when considering the operation of a device such as described herein it is valid to assume that waves on the coupler helices 15 and 16 must be transferred in some measure to the beam helix 14 before the beam interacts therewith and further that energy transfer takes place between the two transmission lines in accordance with general directional coupling theory.

As the electron stream enters the second or output coupling helix 16, the electrons therein are bunched in accordance with the frequency $f_1$ of the wave introduced on the input coupler 15 and the beam transmission line 14 is propagating an amplified wave which is also of the same frequency as that induced thereon by the input coupler 15.

The output coupler helix 16 is wound in an opposite sense to the beam helix in the same manner as described with respect to the input coupling helix. Therefore, any wave induced along the beam helix 14 by the output coupler helix 16, travels along the beam helix 14 in the same direction as the inducing wave on the output coupler helix and further any wave induced on the output coupler helix 16 by the beam helix 14 will also be propagated along the output coupler helix 16 in the same direction as the inducing wave is propagated on the beam helix. Thus, without further explanation it may be seen that the wave propagating along the beam helix 14 at the frequency $f_1$ introduced by the input coupling helix 15, may be coupled out on the output coupler helix 16 and by properly selecting the length of the helix, substantially 100% of the power in the wave on the beam helix 14 may be transferred to the output helix 16. Consequently, an output is produced at the output helix 16 which has a frequency $f_1$ as produced by the input helix 15.

More important, however, with respect to the length of the output coupler 16, is the frequency $f_2$ of the second wave which is introduced on the output coupler by means of the coaxial transmission line 31. The wave so introduced is that which is to be modulated with the wave introduced on the input coupler 15. The length of the output coupler 16 may be selected so that all or substantially all of the power introduced thereon is transferred to the beam helix 14, and the power flow will not have started to reverse from beam helix 14 to output coupler 16. This condition is essential for and leads to the production of balanced modulator action.

The output coupler helix 16 has a considerably larger diameter than the beam helix 14 or the input coupler 15 so that it is more loosely coupled to the beam helix 14 than is the input coupler 15. The purpose of making this coupling loose is to ensure that the length of the output coupler helix 16 required for 100% coupling of the frequency $f_2$ introduced onto this coupler will be a substantial portion of the beam helix length. In this manner a relatively long portion of the beam helix 14 provides interaction between a wave propagating therealong at the frequency $f_2$ and the electron stream 29 which is already modulated at the frequency $f_1$. Thus the electrons in the non-linear modulated stream 29 are further modulated at the frequency $f_2$ introduced in the output helix 16 and provide a gain or amplification of the wave so introduced along the beam helix 14. Because the power introduced at the second frequency $f_2$ will not begin to be transferred back to the output helix 16 until a point is reached on the beam helix 14 which is actually outside the end of the output coupler 16, none of the amplified component of the wave at the frequency $f_2$ is produced on the output coaxial transmission line 32 which is connected to the end of the output coupler 16 opposite the electron gun 18. However, in the interaction area within the ends of the output coupler 16, the electron stream produces its own wave on the beam helix which wave contains components including the sum and difference of the frequencies of the waves applied to the input and output couplers 15 and 16. These sum and difference frequencies; i.e. $f_1+f_2$ and $f_1-f_2$, are the side bands commonly referred to in modulator parlance. These two side bands are produced on the beam helix 14 and grow toward the output end of the tube. The signals of side band frequency are coupled from the beam helix 14 onto the output helix 16 by the directional coupling mechanism described in connection with FIGURE 4. Thus the output helix propagates waves having the frequency $f_1$ applied to the input coupler 15, and the sum of the frequencies applied to the input and output couplers 16 and 17 ($f_1+f_2$) as well as the difference between these two frequencies ($f_1-f_2$) and the waves containing these frequency components may be taken off by an output coaxial cable 36 connected to the output end of output coupler 16. The action of the apparatus is precisely that of a balanced modulator.

Since the action described is dependent upon the interaction of a wave of one frequency upon an electron stream already bunched at another frequency, it is obvious that the stream does not have to be bunched by the particular mechanism described, but that any means for bunching the stream prior to interaction with a wave of a second frequency is within the contemplation of the present invention. For example, it is feasible to utilize a space charge bunching technique such as would be obtained by applying a time vary to the accelerating anode of an electron gun or by interposing a grid in the electron stream and varying the voltage applied to the grid at a modulating frequency. Further the type of bunching generally known as klystron gap bunching might be used. Still another example of a means of prebunching the stream before utilizing it to obtain the modulating action is found in a conventional severed helix tube. In this arrangement, the input beam helix may be used to provide the prebunched electron stream. These arrangements offer a broad range of opportunities for producing a balanced modulator using a high frequency energy interchange device which depends upon the interchange of energy between an electron stream and a radio frequency field propagating through a common interaction region.

While a particular embodiment of the invention has been illustrated and described, it will of course be understood that the invention is not limited thereto since many modifications both in the circuit arrangements and in the instrumentalities employed may be made. It is contemplated that the appended claims will cover any such modifications as fall within the true spirit and scope of this invention.

What I claim is new and desire to secure by Letters Patent of the United States is:

1. A modulator for operation in the centimeter wave length region which comprises a high frequency energy interchange device of the type wherein an interaction takes place between a stream of electrons and radio frequency fields, said high frequency energy interchange device including an evacuated envelope, an electromagnetic wave propagating main transmission line within said envelope, electron stream producing and directing means within said envelope for producing and directing a stream of electrons in close proximity to said transmission line, output coupling means including an output transmission line positioned in energy interchange relationship with said main transmission line for simultaneously introducing a time varying electromagnetic wave along said main transmission line and extracting electromagnetic waves therefrom, said output transmission line comprising a section of substantially a quarter space-beat-wavelength for frequencies to be introduced thereon whereby substantially all of the electromagnetic waves introduced on said output transmission line are transferred to said main transmission line and substantially none of said electromagnetic wave energy is transferred back to said output transmission line, and means for introducing time varying electromagnetic fields to bunch electrons along the stream prior to interaction with the time varying electromagnetic wave introduced on said main transmission line by said output coupling means.

2. The combination in a high frequency energy interchange device of the type wherein an interaction takes place between an electron stream and radio frequency fields in an evacuated envelope of an electromagnetic wave propagating transmission line inside said evacuated envelope, an output coupling transmission line for simultaneously introducing a time varying electromagnetic wave on said wave propagating transmission line and extracting electromagnetic waves therefrom positioned in close proximity to at least a portion of said wave propagating transmission line whereby electric coupling is provided between said transmission lines, said output transmission line comprising a section of substantially a quarter space-beat-wavelength for frequencies to be introduced thereon whereby substantially all of the electromagnetic wave introduced on said output transmission line is transferred to said main transmission line and substantially none of said electromagnetic wave energy is transferred back to said output transmission line, and means to produce an electron stream having electrons distributed therealong in accordance with a time varying electromagnetic fields in said evacuated envelope in close proximity to the portion of said wave propagating transmission line in the region of coupling with said output coupling transmission line.

3. A modulator for operation in the centimeter wave length region which consists of a high frequency energy interchange device wherein an interaction takes place between an electron stream and radio frequency fields, said energy interchange device including an elongated evacuated envelope, an electron stream directing means at one end of said envelope and an electron collecting means at the opposite end of said envelope, an electromagnetic wave propagating transmission line positioned in said envelope intermediate said electron stream producing means and said collector means whereby said electrons pass in close proximity to said transmission line, an output coupler transmission line positioned adjacent said wave propagating transmission line along its length in directionally coupled relationship therewith whereby waves propagated along one of said transmission lines are transferred to the other one of said transmission lines, said output coupler transmission line having electrical input means for introduction of a time varying electromagnetic wave of a first frequency range and electrical output means for delivering a second time varying electromagnetic wave of a second frequency range and means to redistribute electrons along said stream in response to another applied time varying wave of yet another frequency range prior to entry into the region of energy transfer between said transmission lines.

4. In a modulator for operation in the centimeter wave length region, an elongated evacuated envelope, a main transmission line disposed within said envelope, electron gun means disposed at one end of said envelope for directing an electron stream therethrough in close proximity to said main transmission line, modulating means for bunching electrons along said stream in accordance with a time varying electromagnetic fields, and an output coupler transmission line directionally coupled to said main transmission line along its length in a region traversed by the prebunched electron stream in such a manner that a transferral of waves propagated on said transmission lines occurs, said output coupler transmission line having input and output terminal means for simultaneous introduction and extraction of electromagnetic waves and comprising a section which is substantially a quarter space-beat-wavelength in terms of the electromagnetic waves introduced at said input terminal means whereby said waves do not occur at said output terminal means.

5. The combination in a high frequency energy interchange device of the type wherein an interaction takes place between an electron stream and radio frequency fields in an evacuated envelope of a helical slow-wave transmission line inside said evacuated envelope, a helical output coupling transmission line positioned in close proximity to at least a portion of said slow-wave transmission line and having its longitudinal axis parallel to the axis of said slow-wave transmission line, input and output means associated with said helical output coupling transmission line for simultaneously introducing a time varying electromagnetic wave on said slow-wave transmission line and extracting electromagnetic waves therefrom, said output coupling transmission line comprising a section of substantially a quarter space-beat-wavelength for the electromagnetic wave introduce thereon whereby said electromagnetic wave is substantially non-existent at the said output means associated with said output coupling transmission line, and means to produce an electron stream having electrons distributed therein in accordance with a time varying electromagnetic field in said evacuated envelope in close proximity to the portion of said slow-wave transmission line in the region of coupling with said output coupling transmission line.

6. In a modulator for operation in the centimeter wave length region, an elongated evacuated envelope, a main helical slow-wave transmission line disposed within said envelope, electron stream producing means disposed at one end of said envelope for directing an electron stream therethrough in close proximity to said slow-wave transmission line, modulating means for redistributing electrons within said stream in accordance with a time varying electromagnetic field, an output coupler helical transmission line concentrically disposed with respect to said main helical transmission line along its length in a region traversed by the prebunched electron stream in such a manner that an interchange of electromagnetic waves propagated on said transmission lines occurs, said output coupler having input and output wave propagating means for simultaneous introduction and extraction of electromagnetic waves and comprising a section of substantially a quarter space-beat-wavelength for electromagnetic waves introduced thereon whereby electromagnetic waves introduced at said input means are substantially eliminated from said output means.

7. A modulator for operation in the centimeter wave length region which comprises a high frequency energy interchange device of the type wherein an interaction takes place between a stream of electrons and radio frequency fields, said high frequency energy interchange device including an elongated evacuated envelope, a helical electromagnetic wave propagating transmission line positioned within said envelope intermediate at its ends, electron stream producing and directing means positioned within said envelope at one end for directing a stream of electrons along the length of said main transmission line in close proximity thereto, collecting means at the opposite end of said envelope for collecting electrons from said stream, a helical output coupling transmission line positioned in close proximity to at least a portion of said main transmission line, said output coupling transmission line having its longitudinal axis parallel to the axis of said main transmission line for simultaneously introducing a time varying electromagnetic wave on said output coupling transmission line and extracting electromagnetic waves therefrom, said helical output coupling transmission line and comprising a section of substantially a quarter space-beat-wavelength for electromagnetic waves introduced thereon whereby electromagnetic waves introduced at said input means are substantially eliminated from said output means wound in a sense with respect to said main transmission line whereby electromagnetic waves transferred between lines travel in the same direction, and means to redistribute electrons along said stream in accordance with a time vary electromagnetic waves prior to interaction with time varying electromagnetic waves introduced on said main transmission line by said output coupler.

8. The combination in a modulator for operation in the centimeter wave length region of a high frequency energy interchange device wherein an interaction takes place between a stream of electrons and radio frequency fields, said high frequency energy interchange device including an elongated evacuated envelope, a main helical electromagnetic wave propagating transmission line positioned within said envelope intermediate its ends, electron stream producing and directing means positioned within said envelope at one end for directing a stream of electrons along the length of said main transmission line in close proximity thereto, collecting means at the opposite end of said envelope for collecting electrons from said stream, a helical output coupling transmission line positioned coaxially with respect to at least a portion of said main transmission line, said output coupling transmission line having its longitudinal axis parallel to the axis of said main transmission line for simultaneously introducing a time varying electromagnetic wave on said output coupling transmission line and extraction of electromagnetic waves therefrom, said helical output coupling transmission line comprising a quarter space-beat-wavelength section for the electromagnetic waves introduced there whereby the said introduced electromagnetic waves are substantially eliminated from the output of said output coupling transmission line, said helical output coupling transmission line being wound in an opposite sense to said main transmission line whereby electromagnetic waves transferred between lines travel in the same direction, and means to redistribute electrons within said stream in accordance with a time varying electromagnetic field prior to interaction with time varying electromagnetic waves introduced on said main transmission line by said output coupler.

9. A balanced modulator for operation in the centimeter wave length region which comprises a high frequency energy interchange device of the type wherein an interaction takes place between a stream of electrons and radio frequency fields said high frequency energy interchange device including an elongated evacuated envelope, a main helical electromagnetic wave propagating transmission line positioned within said envelope intermediate its ends, electron stream producing and directing means positioned within said envelope at one end for directing the stream of electrons along the length of said main transmission line in close proximity thereto, collecting means at the opposite end of said envelope for collecting electrons from said stream, a helical input coupling transmission line positioned in close proximity to at least a portion of said main transmission line and adjacent to the electron stream producing means for introducing electromagnetic waves onto said main transmission line, a helical output coupling transmission line positioned in close proximity to at least a portion of said main transmission line adjacent said collecting means and having its longitudinal axis parallel to the axis of said main transmission line for simultaneously introducing a time varying electromagnetic wave on said output coupling transmission line and extracting electromagnetic waves therefrom, said output helical transmission line comprising a substantially quarter space-beat-wavelength section for the wave introduced thereon whereby the waves introduced thereon are substantially totally transferred to said main transmission line.

10. A balanced modulator for operation in the centimeter wave length region which comprises a high frequency energy interchange device of the type wherein an interaction takes place between a stream of electrons and radio frequency fields, said high frequency energy interchange device including an elongated evacuated envelope, a main helical electromagnetic wave propagating transmission line positioned within said envelope intermediate its ends, electron stream producing and directing means positioned within said envelope at one end for directing the stream of electrons along the length of said main transmission line in close proximity thereto, collecting means at the opposite end of said envelope for collecting electrons from said stream, a helical input coupling transmission line coaxially with respect to at least a portion of said main transmission line adjacent to the electron stream producing means for introducing electromagnetic waves onto said main transmission line, a helical output coupling transmission line coaxially positioned with respect to at least a portion of said main transmission line adjacent said collecting means for simultaneously introducing a time varying electromagnetic wave on said output coupling transmission line and extracting electromagnetic waves therefrom, said helical input and output transmission line both being wound in an opposite sense to said helical main transmission line, and said output helical transmission line comprising a section of substantially one quarter space-beat-wavelength for the electromagnetic waves introduced thereon whereby the introduced waves are substantially totally transferred to said main helical transmission line.

References Cited in the file of this patent

UNITED STATES PATENTS

| | | |
|---|---|---|
| 2,579,480 | Feenberg | Dec. 25, 1951 |
| 2,588,832 | Hansell | Mar. 11, 1952 |
| 2,657,305 | Knol et al. | Oct. 27, 1953 |
| 2,726,291 | Quate | Dec. 6, 1955 |
| 2,767,259 | Peter | Oct. 16, 1956 |
| 2,794,936 | Huber | June 4, 1957 |
| 2,814,779 | Mendel | Nov. 26, 1957 |
| 2,828,439 | Fletcher | Mar. 25, 1958 |
| 2,894,168 | Wing et al. | July 7, 1959 |

FOREIGN PATENTS

| | | |
|---|---|---|
| 951,092 | France | Apr. 11, 1949 |
| 696,058 | Great Britain | Aug. 26, 1953 |

OTHER REFERENCES

Suhl: "A Proposal for a Ferromagnetic Amplifier," Phyical Review, vol. 106, pages 384 and 385, April 1957.